Figure 1:
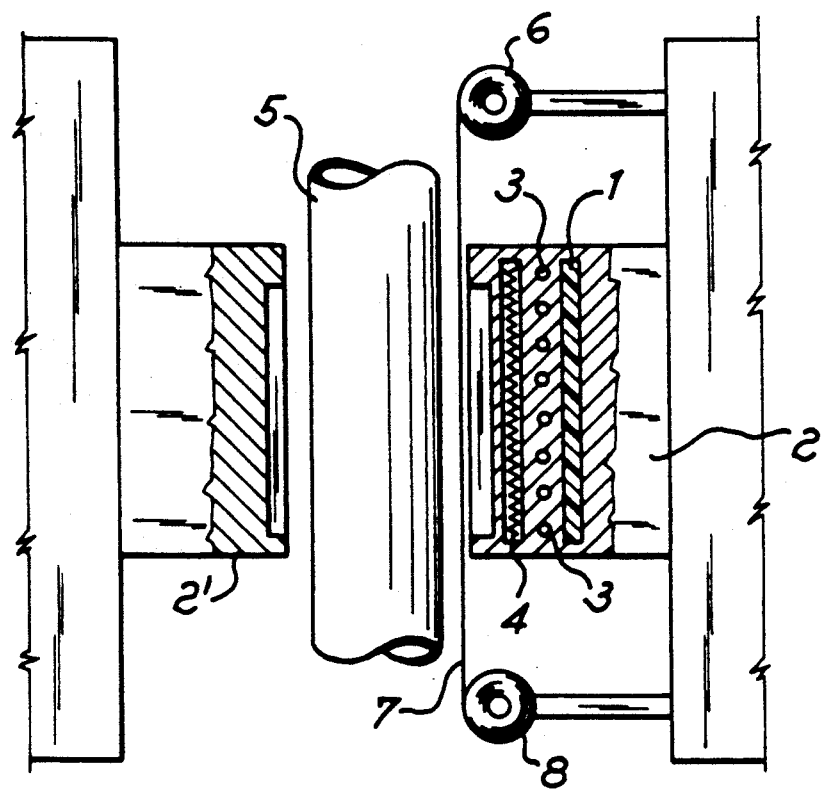

United States Patent [19]
Addeo et al.

[11] Patent Number: 5,232,653
[45] Date of Patent: Aug. 3, 1993

[54] PROCESS FOR PREPARING SURFACE-UPGRADED MOLDED ARTICLES USING A LOW THERMAL INERTIA MOLD

[75] Inventors: Antonio Addeo, Naples; Vincenzo Cocca; Ivano Tommasi, both of Milan, all of Italy

[73] Assignee: Centro Sviluppo Settori Impiego S.r.L., Milan, Italy

[21] Appl. No.: 782,406

[22] Filed: Oct. 25, 1991

[30] Foreign Application Priority Data

Nov. 2, 1990 [IT] Italy ............................ 21965 A/90

[51] Int. Cl.$^5$ ................ B29C 49/04; B29C 49/20; B29C 51/12
[52] U.S. Cl. ................ 264/515; 264/259; 264/511; 264/512; 264/516; 425/503; 425/504; 425/509; 425/521; 156/212; 156/245; 156/308.2
[58] Field of Search ............ 264/509, 512, 510, 511, 264/515, 516, 259, 266, 265; 156/245, 285, 244.14, 212, 228, 230, 238, 240, 308.2, 308.9; 425/503, 504, 508, 509, 521, 384; 249/79, 80

[56] References Cited

U.S. PATENT DOCUMENTS

| | | | |
|---|---|---|---|
| 3,736,201 | 5/1973 | Teraoka | 156/145 |
| 5,017,126 | 5/1991 | Yamada et al. | 425/526 |
| 5,041,247 | 8/1991 | Kim | 425/526 |

FOREIGN PATENT DOCUMENTS

| | | | |
|---|---|---|---|
| 1587186 | 3/1970 | France | . |
| 48-9579 | 3/1973 | Japan | 264/515 |
| 57-020328 | 2/1982 | Japan | 425/526 |
| 59-73926 | 4/1984 | Japan | . |
| 59-150731 | 8/1984 | Japan | . |
| 61-148021 | 7/1986 | Japan | 264/515 |
| 63-249615 | 10/1988 | Japan | 425/503 |
| 63-252718 | 10/1988 | Japan | 425/503 |

OTHER PUBLICATIONS

Kiek–Othmer, 3rd Edition, vol. 6, pp. 406–407.

*Primary Examiner*—Catherine Timm
*Attorney, Agent, or Firm*—Bryan Cave

[57] ABSTRACT

Blow molding and thermoforming processes in which a mold system having low thermal inertia mold-halves provided with heating and cooling systems is utilized for producing plastic articles coated with surface-upgrading films of high melting polymers or polymers exhibiting a high scratch resistance to improve mechanical characteristics of the molded article. The films may be positioned, before the mold is closed, close to the low thermal inertia mold-halves. Rapid heating and rapid cooling of the mold-halves in contact with the surface-upgraded films permit strength adhesion of the upgrading material to the surface of the molded article.

8 Claims, 1 Drawing Sheet

PROCESS FOR PREPARING SURFACE-UPGRADED MOLDED ARTICLES USING A LOW THERMAL INERTIA MOLD

FIELD OF THE INVENTION

The present invention concerns a low thermal inertia mold.

More in particular the present invention relates to a low thermal inertia mold and its use for the surface upgrading of articles manufactured by blow molding or thermoforming.

BACKGROUND OF THE INVENTION

Coupling of surface-upgrading films to manufactured articles made of thermoplastic materials is a known technique in the injection molding technology. The technique is utilized to confer finished articles an external surface exhibiting improved mechanical, aesthetic or decorative characteristics.

Said technique can be carried out by two methods: the first method involves positioning in the mold a polymeric film supporting a layer of surface-upgrading material, which is transferred from the film onto the external surface of the manufactured articles during the production process; the second method is based on using films which consist themselves of the surface-upgrading material and which remain adhered to the molded object as a result of the melting of their surface layer in contact with the manufactured article.

In both of the above described methods, high temperature/pressure conditions typical of injection molding are required, in addition to chemical compatibility between the materials, in order to achieve a permanent adhesion of the surface-upgrading material to the manufactured article.

The film can be positioned in the mold by different techniques, e.g. unwinding of reels placed in proximity of the mold, or performing a direct deposition in the mold using automated devices similar to those adopted for labelling of bottles. In both cases, the film is held in the mold by appropriate techniques, e.g. by applying vacuum or by effect of electrostatic charges.

With this technique manufactured articles are produced such as wheel covers for motor vehicles, panels made of artificial wood or artificial marble, articles for cosmetics, etc.

However, the utilization of the upgrading films presently on the market can less feasibly be proposed for the conventional blow molding and thermoforming technologies, since these technologies are characterized by remarkably lower temperatures and pressures than in injection molding.

An alternative method to overcome this limitation could have been that of improving chemical compatibility between upgrading materials and polymers used to mold the article, e.g. chemical etching, flame treatment, exposure to a corona discharge, application of primers, etc.

Experience has however demonstrated that in the case of blow molding or thermoforming these compatibilization techniques, in addition to increasing the production costs, have not given good practical results in terms of long term adhesion.

THE PRESENT INVENTION

The Applicant has now found a system for rendering coupling possible, without resorting to particular modifications of the substrate to promote the adhesion of surface-upgrading films, which is based on using a low thermal inertia mold in the processing stage (blow molding or thermoforming).

Said mold permits rapid thermal changes, as a result of an appropriate cooling/heating system, thereby allowing to:

(a) establish at the surface level of the article (and therefore of the upgrading film) temperature values which are greater than the typical values of blow molding or thermoforming an consequently permit adhesion of the upgrading material to the surface of the molded object; and (b) rapidly cool the adhered film to temperature values which permit extraction of the finished article from the mold.

It is therefore an object of the present invention to provide a low thermal inertia mold consisting of two mold-halves, each reproducing half of the impression of the article to be produced, characterized in that at least one of said mold-halves comprises within the interior a cooling system and a heating system located in the proximity of the surface of the mold-half impression.

In particular the molds referred to in the present invention are molds for blow molding and thermoforming.

The cooling system inserted in one of the two mold-halves preferably consists of at least one coil in which a cooling fluid is circulated, e.g. water, whereas the heating system may consist of one or more resistors or of an additional coil in which a high temperature fluid is circulated, e.g. superheated steam or heat-transfer oil.

According to a preferred embodiment of the mold object of the present invention the heating system is positioned between the surface of the mold-half impression and the cooling system, or, in the case of at least one coil utilized for each of the systems, the coil can be single and first the high temperature fluid and subsequently the cooling fluid are circulated in said coil.

Both the cooling and the heating systems are located in the proximity of the surface of the mold-half impression. This means that both systems are located at a distance from said surface of at least 0.5 cm and generally comprised between 1.5 and 5 cm.

In order to favor heat transfer through the mold-half surface, the part of the mold-half containing the two cooling and heating systems is preferably made of a high thermal conductivity metal, such as copper, silver, brass, bronze, aluminum, etc.

Even though not necessary, in order to again favor the above mentioned heat transfer, the part of the mold-half comprising the two cooling and heating systems can be separated from the remaining part of the mold-half by a thermal insulating layer, made for example of ceramic material.

A process for preparing molded articles having an upgraded surface by blow molding using the mold which is object of the present invention, comprises:

(a) positioning a surface-upgrading film close to at least one of the two mold-halves of the open mold for blow molding, said mold-half containing, in the proximity of the surface of the mold-half impression, the cooling system and the heating system;

(b) extruding a tube of a thermoplastic polymer in between the two open mold-halves, closing the mold and inflating air into the tube;

(c) rapidly heating (20-120 seconds) the surface of the mold-half in contact with the surface-upgrading film to a temperature greater than 100° C., generally between 120° and 200° C.;

(d) rapidly cooling (20-120 seconds) the surface of the mold-half to a temperature close to that of the inflated tube, (e) stopping the inflation and extracting the finished article, after possible further cooling.

Analogously, a process for preparing molded articles having an upgraded surface by thermoforming, using the mold which is object of the present invention, comprises:

(a) positioning a surface-upgrading film close to at least one of the two mold-halves of the open thermoforming mold, said mold-half containing, in the proximity of the surface of the mold-half impression, the cooling system and the heating system;

(b) heating a sheet or foil of thermoplastic polymer to its softening temperature;

(c) thermoforming the sheet or foil, coupling it to the surface-upgrading film;

(d) rapidly heating (20-120 seconds) the surface of the mold-half in contact with the upgrading film to a temperature greater than 100° C., generally between 120° and 200° C.;

(e) rapidly cooling (20-120 seconds) the surface of the mold-half to a temperature close to that of the thermoformed sheet;

(f) extracting the finished article, after possible further cooling.

In the above described molding processes by blow molding or thermoforming, the thermoplastic polymers constituting the extruded tubes (blow molding) and the sheets or foils (thermoforming) are those normally utilized in said technologies. Examples of said polymers comprise: polystyrene, impact modified polystyrene, polystyrene modified with polar monomers such as acrylonitrile, styrene containing alloys such as ABS, SAN, etc., polyvinylchloride, high, medium and low density polyethylene, polypropylene, impact modified polypropylene, ethylene/propylene copolymers, acrylic and/or methacrylic resins, polymethylmethacrylates, polyester resins such as PET, PBT, etc., or mixtures thereof.

Preferred products are polystyrene, impact modified polystyrene, styrene containing alloys, polypropylene and impact modified polypropylene.

Surface-upgrading films are also well known to the skilled in the art. Said films, also made of thermoplastic polymers, comprise, as described above, a surface-upgrading layer and an adhering layer or may consist, according to the present invention, of a single surface-upgrading layer. The upgrading layer generally consists of high melting polymers or polymers exhibiting high scratch resistance, such as polyethyleneterephthalate, polymethylmethacrylate, etc.

Figure 2:
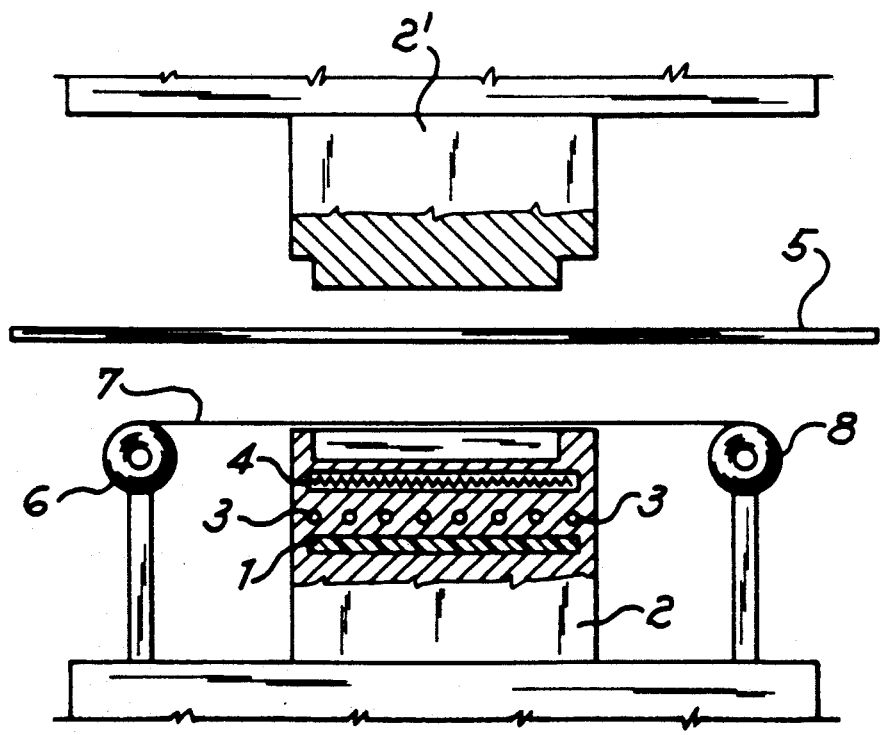

A practical embodiment, which exemplifies and is in no way limitative to the mold object of the present invention, is illustrated in the attached drawings wherein:

FIG. 1 shows a cross-section of a low thermal inertia mold for blow molding; and FIG. 2 shows a cross-section of a low thermal inertia mold for thermoforming.

Referring to the figures, the present mold consists of two mold-halves (2) and (2'). A cooling system (3), consisting of an hydraulic circuit (coil), and a heating system (4) consisting of electrical resistances have been placed in one of the two mold-halves (2). Both systems are positioned in the proximity of the surface of the mold-half impression and are thermally insulated from the body of the mold-half through an isolating layer (1). The operation of the mold is clear on the basis of the figures and the preceding description. AN extruded tube or planar sheet (5), ready to be processed by blow molding or thermoforming, is positioned between the two halves (2) and (2') of the mold. A surface-upgrading film (7) interposed between the tube or sheet (5) and the mold-half (2) is unwound from a reel (6) and tensioned by the roll (8). At the moment of fabrication, the mold is closed and molding proceeds according to the conventional technologies. The tube or sheet is molded taking the form of the object to be produced by simultaneously pressing the surface-upgrading film (7) against the mold-half impression (2). Still maintaining the mold closed, one thereafter proceeds to adhere the film onto the surface of the molded article. To said purpose only the mold-half impression (2) is heated, through the resistors (4), to a temperature sufficiently high as to melt the film, or to transfer the surface-upgrading layer, thereafter cooling the same impression through the cooling circuit (3), thereby solidifying the film, or layer, which remains attached to the surface of the molded article.

As a result of the position of the two systems, as well as of the presence of the insulating layer (1), only the surface of the mold-half (2) undergoes the above described heating/cooling effect, which, for the same reasons, can be rapidly and exclusively accomplished at the surface level of the molded article.

In the practice of the present invention, changes, modifications and variations can be made to the various parts which constitute the low thermal inertia mold illustrated, as a mean of providing an example, in the figures of the attached drawings, while remaining within the spirit and scope of the present invention.

What is claimed is:

1. A blow molding process for making articles that are at least partially covered by a surface-upgrading layer, the process comprising:

(a) positioning a surface-upgrading film close to an internal surface of at least one of two mold-halves of a blow molding mold while the mold is open, the at least one of two mold-halves comprising means for heating and cooling at least part of said internal surface;

(b) extruding a tube made of a first thermoplastic polymer between the two open mold-halves, closing the mold and inflating the tube with air to blow mold the tube against the surface-upgrading film;

(c) rapidly heating at least part of said internal surface to a temperature sufficient to melt the surface-upgrading film to adhere the surface-upgrading film to the inflated tube;

(d) rapidly cooling at least part of said internal surface to a temperature close to that of the inflated tube; and (e) stopping the inflation and extracting the finished article;

wherein, the surface-upgrading film is a second thermoplastic polymer having a melting point which is higher than the melting point of the first thermoplastic polymer.

2. The process of claim 1 wherein the surface-upgrading film is unwound from a reel configured at one side of the mold and tensioned by a roll configured at a different side of the mold.

3. The process of claim 1 wherein at least part of said internal surface is heated to a temperature from 120° C.-200° C.

4. The process of claim 1 wherein the heating and cooling steps are conducted for 20-120 seconds.

5. A thermoforming process for making articles that are at least partially covered by a surface-upgrading layer, the process comprising:
   (a) positioning a surface-upgrading film close to an internal surface of at least one of two mold-halves of a thermoforming mold while the mold is open, the at least one of two mold-halves comprising means for heating and cooling at least part of said internal surface;
   (b) heating a sheet or foil made of a first thermoplastic polymer to the softening temperature of the polymer;
   (c) thermoforming the sheet or foil and coupling it to the surface-upgrading film;
   (d) rapidly heating at least part of said internal surface to a temperature sufficient to melt the surface-upgrading film so that the surface-upgrading film adheres to the thermoformed sheet;
   (e) rapidly cooling at least part of said internal surface to a temperature close to that of the thermoformed sheet; and
   (f) extracting the finished article;
wherein the surface-upgrading film comprises a second thermoplastic polymer having a melting point which is higher than the softening point of the first thermoplastic polymer.

6. The process of claim 5 wherein the surface-upgrading film is unwound from a reel configured at one side of the mold and tensioned by a roll configured at a different side of the mold.

7. The process of claim 5 wherein at least part of said internal surface is heated to a temperature from 120° C.-200° C.

8. The process of claim 5 wherein the heating and cooling steps are conducted for 20-120 seconds.

* * * * *